Nov. 28, 1967    A. DOUNOUCOS    3,354,618
GAS EXCHANGER

Filed Aug. 26, 1965    2 Sheets-Sheet 1

Inventor:
Angelo Dounoucos,
by Paul G. Frank
His Attorney.

Nov. 28, 1967   A. DOUNOUCOS   3,354,618
GAS EXCHANGER
Filed Aug. 26, 1965   2 Sheets-Sheet 2

Inventor:
Angelo Dounoucos,
by Paul A. Frank
His Attorney.

United States Patent Office 3,354,618
Patented Nov. 28, 1967

3,354,618
GAS EXCHANGER
Angelo Dounoucos, Schenectady, N.Y., assignor to General Electric Company, a corporation of New York
Filed Aug. 26, 1965, Ser. No. 482,770
3 Claims. (Cl. 55—158)

My invention relates to the transfer of gases, and more particularly, to a new and improved compact apparatus for selectively transferring gas from one area to another.

Many applications in modern technology require the selective extraction of one gas from a group of gases and the transfer of that gas to another fluid medium. The transfer of gas must be done in a manner so that substantially no extraneous gas enters the exchange area and unduly influences the process taking place. Also, the relationship between the gas and the medium it is being transferred to, should be such that an optimum or nearly optimum exchange relationship exists for transfer of gas. The latter is particularly significant, where, as in many industrial applications, a highly efficient compact exchange apparatus is most important. A desirable configuration is one in which, as the exchange process continues, the gas being transferred is always in proximate relationship to a receptive part of the fluid medium to which it is being transferred. A preferred embodiment that produces the proper relationship, is one where the gas to be transferred and the receptive medium, flow in relatively opposite directions across the membrane faces. When such a counterflow configuration is employed for the gas exchange process, the significant problem then becomes enclosing the chambers through which the gas and receiving medium flow so that they are effectively separated from each other and sealed in a manner that permits entrance of gas and receiving medium but prevents entrance of extraneous fluids, which fluids might interfere with the gas exchange process taking place. A compact gas exchange apparatus is then needed for transferring a selected gas to a receptive fluid medium, which exchange apparatus is arranged and sealed to prevent both unwanted gases from interfering with the exchange process and to provide the most effective transfer of gas into the medium.

The chief object of my invention is the provision of an improved gas transfer apparatus which efficiently transfers a fluid to a receiving medium.

Another object of my invention is such a device which is secured by a sealant that prevents the intrusion of unwanted fluids into the transfer process.

Another object of my invention is such a device wherein a counter flow pattern is provided so that gas is transferred to the medium when it is most receptive thereto.

A further object of my invention is such a device which employs a plurality of membranes for more effective gas transfer.

These and other objects of my invention will be more readily perceived from the description which follows.

In carrying out the objects of my invention, I provide a highly efficient gas exchange apparatus comprising a flat planar imperforate membrane barrier, selectively permeable to certain gases, which is placed between a chamber through which one of those selected gases flows and a chamber in which flows a fluid that is receptive to the selected gas. A vulcanizing potting compound is employed to seal the edges of the apparatus, save for entrance and exit openings for the gas and receiving fluid, so that unwanted gases or other fluids are prevented from entering into either chamber and interfering with the gas transferring process taking place. Preferably the direction of flow of the gas through one chamber is opposite to the direction of flow of the receiving fluid through the other chamber so that an optimum amount of gas is transferred to the receiving fluid. Also, a plurality of stacked chambers having membranes therebetween, and alternatively containing gas and receptive fluid medium are employed for increasing the efficiency of the gas transfer apparatus.

The attached drawing illustrates preferred embodiments of my invention in which.

Figure 1:
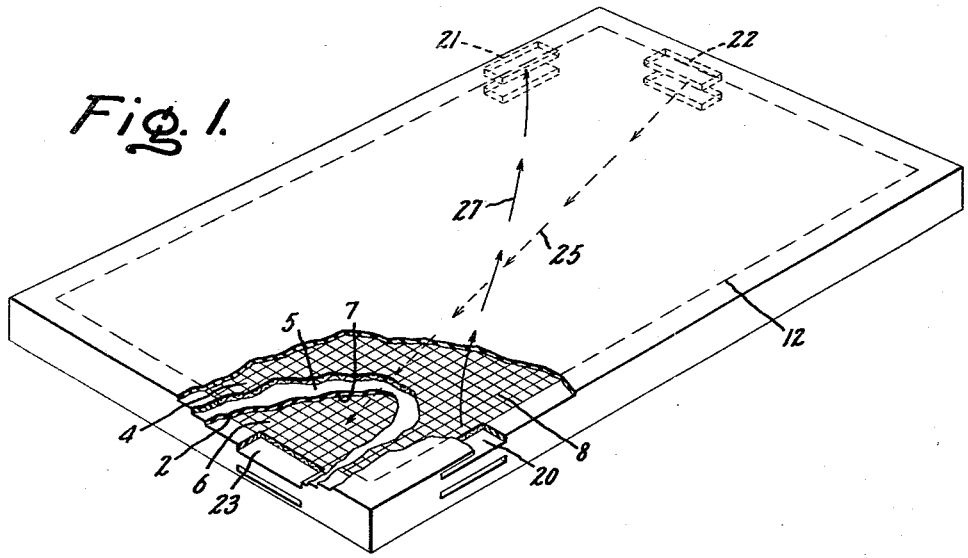
FIGURE 1 is a view of the gas transfer device of my invention.

In the view of the gas transfer apparatus of my invention shown in FIGURE 1, a suitable imperforate membrane 2, which is selectively permeable to certain gases, forms a separation means between chambers 4 and 6 through which the feed gas to be transferred and the receiving medium, respectively, flow. Oxygen and air are a few of the gases that are particularly suited for use as feed gas. Membrane 2 is constructed of an imperforate material, such as the silicone rubber membranes of patent applications Serial Numbers 241,346 filed November 30, 1962, now Patent No. 3,256,675; 247,904 filed December 28, 1962, now Patent No. 3,274,750; 269,430 filed April 1, 1963, now abandoned; 397,687 filed September 21, 1964 and 466,698 filed June 6, 1965, now Patent No. 3,325,330, by Walter L. Robb and assigned to the assignee of the present invention, which permits certain specific gases or vapors to pass therethrough to the substantial exclusion of others. The gases or vapors that permeate the membrane do so on the basis of a partial pressure differential across the membrane; the gas or vapor passes from the side of greater partial pressure to the side of lesser partial pressure. For example, if the partial pressure of oxygen gas flowing through chamber 4 is 3.1 lbs. per square inch, as would be the case of oxygen in air, and the partial pressure of oxygen in the medium flowing through chamber 6 is far less, oxygen gas will readily permeate membrane 2 to mix with the fluid, with the lower oxygen concentration passing through chamber 6, to thus enrich that fluid in oxygen. Membrane 2 is therefore one that selects a particular gas and passes it through principally on the basis of a partial pressure differential across the membrane.

Figure 2:
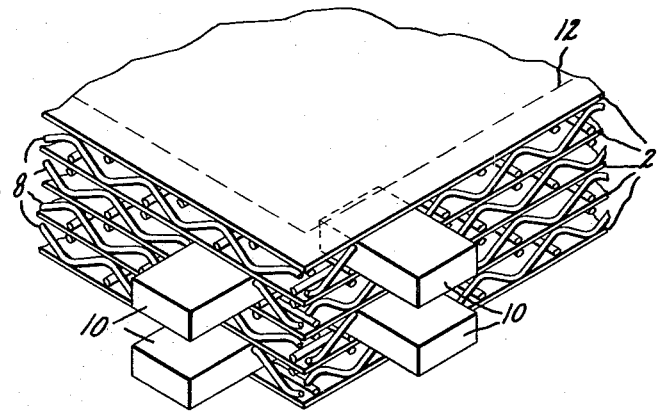
FIGURE 2 is an enlarged sectional view of the apparatus of FIGURE 1 before the sealing compound has been applied.
Figure 3:
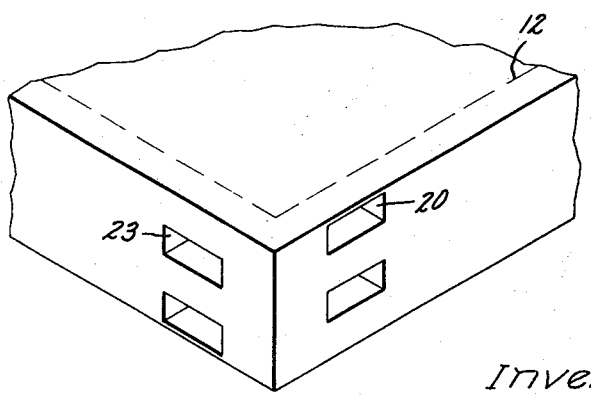
FIGURE 3 is an enlarged sectional view of the apparatus of FIGURE 1 after the sealing compound has been applied.

In forming the gas transfer apparatus as shown in FIGURE 2 membranes 2 are stacked in a surface-to-surface parallel array with screens 8 or other reinforcing means placed therebetween. The screens increase the strength of the membranes to permit greater pressures to be employed without the possibility of rupturing or otherwise damaging the membranes. Support provided by screens 8 can be sufficiently great so that large absolute pressure differentials can exist across the membrane, if desired. In other words, the screen supported membrane can be made to withstand a condition where the total pressure (the pressure of all the gases together) in chamber 4 is far greater than the total pressure in chamber 6 or vice versa, if it is desired to operate under such differential pressure conditions; though the total pressure in both chambers 4 and 6 is often substantially the same. The screens themselves are fabricated of a suitable plastic or metal and constructed in the conventional cross-hatched fashion. Thus by employing a bracer having holes therein, such as screening 8, an effective support is provided that does not significantly interfere with the gas transfer process.

The stack of membranes and screening is then prepared for securing by being interspersed with spacers 10 or plugs, as shown in FIGURE 2, which form gaps in the securing compound, which gaps become the entrance and exit openings through which gases and other fluids are passed through the gas exchange apparatus. Plugs 10 which are inserted between the layers of membrane 2, are constructed of a material, such as polytetrafluoroethylene, that does not adhere to the sealing compound. When a planar configuration is employed with a plurality of membranes as shown in FIGURES 1 and 2, spacers 10 are preferably flat and of a height equal to the desired spacing between the membranes so that the spacers not only form the entrance and exit channels, but also support the membranes in the desired relationship while they are being secured together. While a rectangular cross-sectional configuration is shown for spacers 10, it will be appreciated that this is but one of numerous shapes that can be employed successfully with my invention. The positioning of the spacers, as will subsequently be discussed, is important in determining the respective flow paths of the gas and the fluid in passing through the flow areas between the membranes. By proper positioning of spacers 10 the transfer gas flows through chamber 4 in a direction opposite to the direction that the receiving medium flows through chamber 6, so that a counterflow relationship between the gas and the receiving medium is achieved. By the use of counter flow exchange, the partial pressure differential between the gas and the receiving medium is always kept at an optimum value so that effective transfer of gas to the receiving fluid medium takes place.

When the membranes, screens and spacers are properly arranged in package form as shown in FIGURE 2, the edge of the package is dipped in a suitable sealing compound, preferably a vulcanizing rubber compound such as the curable siloxane potting substances described in U.S. Patent No. 3,133,891 to Louis Cezzeriat. Each edge of the apparatus is inserted in the potting compound to a depth, as shown by dotted lines 12, sufficient to effectively secure the membranes together and form a secure leak-proof seal that prevents any extraneous gases from entering the apparatus and interfering with the transfer process taking place. Any outside gas would disturb the partial pressure levels being maintained and also the flow relationship taking place within the device. Also by extending the sealing substance to dotted line 12, the sealant serves the aforementioned purposes without affecting the interior flow area between the membranes in which the gas transfer process is effectuated. It is noted that plugs 10 extend beyond line 12 so that the channels that they form in the potting compound extend completely through the potting substance and thus the entrance and exit channels that are formed therein are not affected by the sealing substance. One particular advantageous feature of using substances, such as the aforementioned curable siloxanes is that setting takes place quickly and without the application of any pressure to the apparatus. Heretofore any sealant employed required the application of pressure to the completed membrane package to effect the proper seal; a procedure which often ruptured or adversely effected the delicate membranes themselves and collapsed or substantially impaired the thin entrance and exit channels through which the fluids enter and leave the apparatus. With the present sealing procedure intricate channels can readily be produced, to form the desired counterflow gas exchange apparatus, previously described.

In the operation of the device of FIGURE 1, gas to be transferred enters the apparatus through port 20, whereupon it diffuses throughout chamber 4 to occupy the entire volume therein and cover surface area 5 of membrane 2. In like manner, the gas receiving medium enters chamber 6 through entrance means or port 22 to substantially fill chamber 6 and cover surface area 7, the other side of membrane 2. The gas now permeates membrane 2, by interaction between the molecules of the gas and the molecules of the membrane, as described in the previously indicated patent applications to Robb. The permeation always proceeds from the area of higher partial pressure to the area of lower partial pressure. Thus, for the gas transfer process to take place, the gas to be transferred should have a higher partial pressure in the chamber it is initially flowing through, chamber 4, than the chamber it is to be transferred to, chamber 6. The total pressure of the gas flowing through chamber 4 and/or the total pressure of the receiving gas flowing through chamber 6 may be varied within wide limits, while still maintaining the proper partial pressure differential of the desired gas in chambers 4 and 6, so that this gas readily permeates membrane 2 from chamber 4 to chamber 6. Thus equal total pressures may be maintained in chambers 4 and 6 or a high total pressure can be maintained in either chambers 4 and 6, while a low pressure is maintained in the other chamber.

Figure 1A:
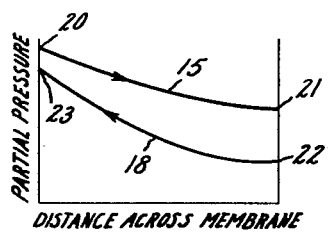
FIGURE 1A is a graphical illustration of the counterflow process with the device of FIGURE 1.

An important aspect of using membranes for gas exchange is in passing the gas and the receiving medium across the faces of the membrane in a manner so that an optimum amount of gas is transferred to the receiving medium. FIGURE 1 illustrates such an optimum configuration. The gas, as shown by solid lines 27, flows in a direction through the apparatus opposite to that of the receiving medium, as shown by the dotted lines 25. As the gas, to be transferred, enters port 20, its partial pressure is at the highest level and slowly decreases in value as the gas travels across face 5 of membrane 2 and leaves through orifice or port 21 to be used, as desired. In a similar manner, the receiving medium which is a fluid, such as a gas or combination of gases, which may contain a constituent that is the same as the gas being transferred, or alternatively may be composed of entirely different gas than the gas being transferred, enters port 22, proximate port 21, the transfer gas exit port, and travels across face 7 of membrane 2, picking up transferred gas that has permeated membrane 2, to thereby produce a new combination of gases which is richer in the transferred gas. This new combination of gases exits through port means or orifice 23, proximate transfer gas inlet orifice 20. Hence because of the relationship between inlet and exhaust orifices of both the transfer gas and the receiving medium, they flow in nearly opposite directions across the respective faces of membrane 2. In FIGURE 1A, this counterflow relationship is illustrated. The transfer gas as shown by solid line 15 decreases in partial pressure as it flows through the apparatus from inlet point 20 to exit point 21; the reduction in partial pressure being due to gas being transferred through membrane 2 to the receiving medium. In a like manner, the partial pressure of the transfer gas in the receiving medium as shown by line 18 increases as flow proceeds from inlet 22 to exit 23 because of the gas transferred to the receiving medium through membrane 2. It will be appreciated that because of the counterflow arrangement, the partial pressure of transfer gas in the receiving medium, at and near exit port 23, is greater than the exiting partial pressure of the transfer gas at point 21. This relationship is achieved because as the transfer gas in the receiving medium increases in partial pressure, the receiving medium has progressed to a point along the surface of the membrane where it is in contact with fresher incoming transfer gas, which is, of course, at a greater partial pressure. Thus, as the gas in the receiving medium increases in partial pressure, the transfer gas in proximity therewith is also at a greater partial pressure. Because of this relationship a significant partial pressure differential is always maintained across the membrane so that far greater amount of transfer gas can be conveyed to the receiving medium, than if this were not true. If the counterflow relationship was not used and the transfer gas and receiving medium were flowing in the same directions the receiving medium at and near exit would be in contact with the exiting transfer gas and thus would be limited by the low partial pressure of the transfer gas at this point, a partial pressure which, as shown by the graph, would significantly reduce, if not completely eliminate the amount of transfer gas that can be conveyed to the receiving medium at this point. Thus, with the counter flow arrangement, the receiving medium is always in proximity with a high partial pressure transfer gas, for the most effective operation.

With the apparatus of FIGURE 1, as shown therein, a plurality of membranes, and thereby a plurality of transfer gas chambers, and receiving medium chambers are employed. Operation is as previously described with respect to a single membrane, with the additional asset that each chamber of receiving medium is in contact with two chambers (except the top and bottom membrane), one above and one below, containing transfer gas and vice versa with respect to the chambers of transfer gas. Thus transfer of gas is faster and more uniform because of the great amount of gas in proximity with membranes and thereby with receiving media, during operation of the apparatus.

The receiving medium, and/or the transfer gas may be repassed through the apparatus, if desired, by taking the output from one chamber and piping it into the corresponding receiving means or transfer gas input of the next membrane and so on, to further increase the efficiency of operation.

Figure 4:
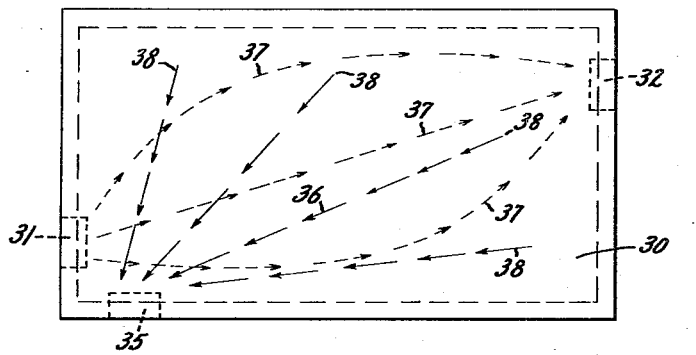
FIGURE 4 is another mode of the apparatus of FIGURE 1.

In FIGURE 4, there is shown an alternate mode of the apparatus of my invention wherein the receiving medium is composed essentially of transfer gas that has permeated the selective membrane. The transfer feed gas, which is composed of a single component that is permeable to the membrane, or a group of components, at least one of which is permeable to the membrane, flows from inlet orifice or port 31 to exit orifice or port 32 as shown by arrows 37, across one face of the membrane. When the gas enters port 31, it spreads out across the surface of membrane 30 and the permeable component begins to pass therethrough. The transfer process continues so that there is a sufficient buildup of gas in the receiving chamber on the reverse side of membrane 30, to cause the gas transferred through the membrane into the chamber to flow out of chamber 34 through exit port 35. The flow pattern of the transferred gas, as shown by the solid arrows 36, is in a direction opposite to the feed gas as shown by broken arrows 37 so that the same counter flow relationship as shown in FIGURES 1 and 1A and as previously described is produced in this embodiment. As the flow of transferred gas proceeds from points 38 across membrane 30, as shown by the solid lines, it is in contact with richer and richer inlet gas flowing in the opposite direction to produce an efficient counterflow device in which permeation of the desired constituent gas is in a quantity which is far greater than that would be produced by other than a counter flow arrangement.

Figure 5:
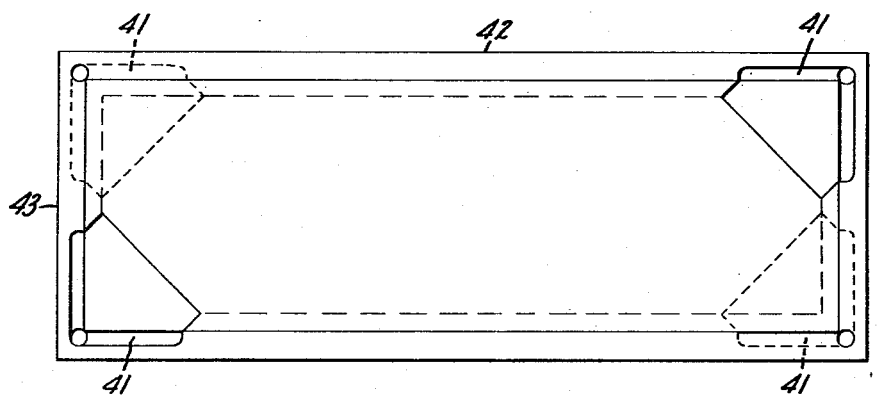
FIGURE 5 is a further alternative mode of the apparatus of FIGURE 1.

FIGURE 5 illustrates a further embodiment of my invention wherein the entry ports are located at the corners of the transfer apparatus. A compact unit is thus produced which functions in the same manner as that of FIGURE 1 and wherein because ports 41 are located at the corners, counterflow is produced therein with no possibility of gas stagnation at the corners of the apparatus. It will be appreciated that the length 42 to width 43 ratio should be sufficiently large, unity or greater, to produce the desired counterflow operation.

It is noted that any of the apparatus I have described may be constructed in a single or a multiple stack arrangement as described with respect to FIGURE 1.

Also, significantly, the membranes I have described pass certain vapors, such as water vapor, equally as well as the aforementioned gases.

Specific embodiments of my invention have been described, but the invention is not limited thereto since many modifications may be made by one skilled in the art and the appended claims are intended to cover all such modifications as fall within the true spirit and scope of my invention.

What I claim as new and desire to secure by Letters Patent of the United States is:

1. A gas transfer apparatus comprising
  a plurality of imperforate membranes placed in closely spaced, substantially parallel relationship to each other to define flow areas therebetween,
  means defining a first passage for directing flow of a feed fluid in proximity to at least one of said membranes, which fluid is composed of at least one gas which readily permeates said membrane,
  means defining a second passage for directing flow of a receiving fluid in proximity to the other side of said membrane in a direction substantially opposite the direction of flow of the feed fluid, for providing a partial pressure differential that results in an optimum gas transfer relationship, said first and second passage means comprising a woven screen lying between said membranes for spacing said membranes from each other, and
  sealing means comprising a siloxane potting compound for securing both said means defining the first passage and said means defining the second passage to said membrane in a manner whereby fluid must permeat the membrane to travel from the first passage to the second passage.

2. A gas transfer apparatus comprising
  a plurality of imperforate silicone rubber membranes, selectively permeable to certain fluids which are placed in closely spaced, substantially parallel relation, to define a first group of flow areas and a second group of flow areas alternating between said first group and parallel thereto, a plurality of woven screens mounted in the flow areas between said imperforate membranes to support and space said membranes,
  a siloxane potting compound for securing the membranes together so that flow passages are formed in the potting compound in communication with the first flow areas to pass a first fluid which has a constituent that readily permeates the membrane in proximity with one side of the membranes, and so that flow passages are also formed in the potting compound in communication with the second flow areas to pass a second fluid in proximity with the other side of the membrane in a substantially opposite direction to the first fluid for causing an optimum amount of the constituent to permeate the membranes.

3. A gas transfer apparatus comprising
  a plurality of closely spaced rectangular imperforate membranes placed in a parallel surface-to-surface array so as to define flow areas therebetween, and
  means defining a first passage having inlet and outlet openings proximate diagonal corners of the rectangular membrane, for directing flow of feed fluid in proximity to said membranes which fluid is composed of at least one gas which readily permeates therethrough,
  means defining a second passage having inlet and outlet openings proximate the opposite diagonal corners with respect to said first passage means for directing flow of a receiving fluid in proximity to the other side of said membrane in a direction substantially opposite to the direction of flow of the feed fluid, to thereby provide a partial pressure differential across the membrane that results in an optimum gas transfer relationship, a plurality of woven screens mounted in the flow areas between said imperforate membranes to support and space said membranes, and sealing means comprising a siloxane potting compound for securing both said means defining the first passage and said means defining the second passage to said membrane in a manner whereby fluid thus permeates the membrane to travel from the first passage to the second passage.

References Cited

UNITED STATES PATENTS

| | | | |
|---|---|---|---|
| 2,618,357 | 11/1952 | Harlow | 55—158 |
| 2,664,395 | 12/1953 | Marchand | 210—321 |
| 2,735,812 | 2/1956 | Van Hoek | 210—321 |
| 2,958,391 | 11/1960 | De Rosset | 55—16 |
| 2,961,062 | 11/1960 | Hunter et al. | 55—158 |
| 3,013,667 | 12/1961 | Jackson et al. | 55—497 X |
| 3,031,827 | 5/1962 | Onstad et al. | 55—496 X |
| 3,133,891 | 5/1964 | Ceyzeriat | 260—18 |
| 3,212,498 | 10/1965 | McKirdy et al. | 210—321 X |
| 3,244,763 | 4/1966 | Cahn | 55—16 |
| 3,250,080 | 5/1966 | Garwin | 55—16 X |

FOREIGN PATENTS

| | | |
|---|---|---|
| 1,328,826 | 4/1963 | France. |
| 972,166 | 10/1964 | Great Britain. |

OTHER REFERENCES

Stern et al.: Helium Recovery By Permeation, in Industrial and Engineering Chemistry, vol. 57, No. 2, February 1965, pp. 49–60.

SAMIH N. ZAHARNA, *Primary Examiner.*

REUBEN FRIEDMAN, *Examiner.*

J. ADEE, *Assistant Examiner.*